US006895244B2

(12) United States Patent
Iyer

(10) Patent No.: US 6,895,244 B2
(45) Date of Patent: May 17, 2005

(54) METHOD FOR AUTOMATED UPDATE OF TELECOMMUNICATIONS DATA IN A WIRELESS NETWORK

(75) Inventor: Gopal N. Iyer, Boca Raton, FL (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 420 days.

(21) Appl. No.: 09/751,459

(22) Filed: Dec. 29, 2000

(65) Prior Publication Data

US 2002/0155830 A1 Oct. 24, 2002

(51) Int. Cl.$^7$ ................................................ H04Q 7/20
(52) U.S. Cl. .................... 455/424; 455/419; 455/414.1; 455/67.11
(58) Field of Search .............................. 455/424, 419, 455/414.1, 67.11, 446, 423, 414, 67, 418; 370/345, 336, 521; 707/246; 715/524

(56) References Cited

U.S. PATENT DOCUMENTS

| 5,220,675 | A | | 6/1993 | Padawer et al. |
|---|---|---|---|---|
| 5,357,557 | A | | 10/1994 | Sakakura |
| 5,694,523 | A | | 12/1997 | Wical |
| 5,713,075 | A | | 1/1998 | Threadgill et al. |
| 5,913,160 | A | * | 6/1999 | Leung .......................... 455/403 |
| 5,920,284 | A | | 7/1999 | Victor |
| 5,953,652 | A | | 9/1999 | Amin et al. |
| 5,969,669 | A | | 10/1999 | Ishikawa et al. |
| 6,014,374 | A | * | 1/2000 | Paneth et al. ................ 370/345 |
| 6,035,043 | A | | 3/2000 | Sansone et al. |
| 6,085,084 | A | | 7/2000 | Christmas |
| 6,128,483 | A | | 10/2000 | Doiron et al. |
| 6,163,596 | A | | 12/2000 | Gelfer et al. |
| 6,185,409 | B1 | | 2/2001 | Threadgill et al. |
| 6,233,447 | B1 | | 5/2001 | Tomoike |
| 6,272,341 | B1 | | 8/2001 | Threadgill et al. |
| 6,311,320 | B1 | | 10/2001 | Jibbe |
| 6,332,069 | B1 | | 12/2001 | Zhao et al. |
| 6,349,205 | B1 | | 2/2002 | Fang et al. |
| 6,352,222 | B1 | | 3/2002 | Maeda et al. |
| 6,445,916 | B1 | | 9/2002 | Rahman |
| 6,453,329 | B1 | * | 9/2002 | Dodgen ....................... 715/516 |
| 6,456,843 | B1 | | 9/2002 | Daly |
| 6,525,657 | B1 | | 2/2003 | Wojcik |
| 6,539,203 | B1 | | 3/2003 | Herrig |
| 6,603,966 | B1 | | 8/2003 | Sheffield |
| 6,636,721 | B2 | | 10/2003 | Threadgill et al. |
| 6,658,646 | B1 | | 12/2003 | Hernandez, III |
| 6,704,565 | B1 | * | 3/2004 | Parsons et al. .......... 455/414.1 |
| 6,775,540 | B2 | * | 8/2004 | Iyer ........................ 455/422.1 |

OTHER PUBLICATIONS

U.S. Appl. No. 09/751,287, filed Dec. 29, 2000.
U.S. Appl. No. 09/751,457, filed Dec. 29, 2000.
U.S. Appl. No. 09/751,458, filed Dec. 29, 2000.
U.S. Appl. No. 09/751,285, filed Dec. 29, 2000.
U.S. Appl. No. 09/751,286, filed Dec. 29, 2000.
U.S. Appl. No. 09/751,456, filed Dec. 29, 2000.
"Corsair Communications Stops One Millio . . . mbat $1.3 Million per Day Fraud Problem," Mar. 27, 1995, accessed at http://is.gseis.edu/impact/w95/RN/mar31news/Merc–news–corsair.html.

* cited by examiner

*Primary Examiner*—David Hudspeth
*Assistant Examiner*—S. Smith
(74) *Attorney, Agent, or Firm*—Merchant & Gould

(57) ABSTRACT

A method and system are provided for updating call-specific data in a database associated with operation of a wireless network. The method includes receiving user input related to a Lucent ECP form, and one or more fields of the form, for which changes are desired. The method also includes generating a script to update the form by identifying one or more values associated with call-specific data in the wireless network. The method also includes creating an apxrcv script based on the user input and the values associated with the call-specific data. Finally, the method involves executing the apxrcv script to update the form. This method can also be implemented in a system or on a computer-readable medium.

19 Claims, 14 Drawing Sheets

```
>pg pp9912.txt
Date      Time(2)   Site_ID  MIN(1)       Dialed_Digits  Tear-Down_Reason
12/25/99  19:26:09  20       2012075854   12014981322    MFG
12/23/99  14:56:20  219      2012075854   56177767114    MFG
12/26/99  21:40:32  167      2012130072   19547814445    MFG
12/23/99  19:06:49  82       2012134416   9544289147     MFG
12/23/99  19:06:23  82       2012134416   9544289147     MFG
12/25/99  17:23:55  82       2012134416   9544285083     MFG
12/25/99  15:06:20  82       2012134416   2015680907     MFG
12/25/99  13:04:16  82       2012134416   2015680907     MFG
12/25/99  13:04:05  82       2012134416   2015680907     MFG
12/25/99  13:03:53  82       2012134416   2015680907     MFG
12/25/99  13:03:31  82       2012134416   2015680907     MFG
12/25/99  13:01:49  82       2012134416   2015680907     MFG
12/25/99  12:53:38  82       2012134416   2015680907     MFG
12/25/99  12:52:32  82       2012134416   2015680907     MFG
12/25/99  12:52:03  82       2012134416   2015680907     MFG
12/25/99  12:50:48  82       2012134416   2015680907     MFG
12/25/99  12:48:15  82       2012134416   2015680907     MFG
12/25/99  12:47:16  82       2012134416   5680907 MFG
12/24/99  11:58:50  82       2012134416   8003328463     MFG
12/24/99  11:58:08  82       2012134416   8003328463     MFG
12/24/99  10:03:16  82       2012134416   9544289147     MFG
12/22/99  14:58:09  80       2012300764   19546467166    MFG
12/29/99  10:54:28  177      2012499657   19086881800    MFG
12/29/99  10:51:49  177      2012499657   9412503698     MFG
12/29/99  10:25:04  145      2012499657   12012400657    MFG
12/29/99  10:24:42  145      2012499657   12012400657    MFG
12/27/99  21:26:01  49       2012476225   15616551115    MFG
12/24/99  19:22:48  219      2012476225   15615551212    MFG
12/24/99  19:22:26  219      2012476225   15615551212    MFG
12/24/99  19:22:06  219      2012476225   15615551212    MFG
12/24/99  19:13:38  219      2012476225   5617950022     MFG
12/27/99  12:01:06  20       2012476225   15614996976    MFG
12/23/99  16:23:47  12       2012640686   3105152822     MFG
12/23/99  16:17:19  12       2012640686   3105152822     MFG
12/23/99  16:17:03  12       2012640686   3105152822     MFG
```

FIG.6

```
>pg map1299
ECP, CellNo,Longitude, Latitude,Count
4,1,-80.1675,26.155278.148
3,5,-80.361111,25.699444,209
1,6,-80.171667,26.36,675
1,7,-80.144167,26.562778,173
1,8,-80.109722,26.760556,76
3,9,-80.317222,25.679444,311
3,10,-80.266667,25.747222,115
4,15,-80.123056,25.854167,510
4,16,-80.198611,26.248889,401
1,18,-80.088889,26.45,380
1,20,-80.058611,26.651944,216
4,22,-80.210833,25.848611,138
4,23,-80.128889,26.085833,844
4,25,-80.288889,25.845556,55
1,26,-80.201111,26.630833,251
4,27,-80.204722,25.93,590
3,38,-80.360833,25.596667,255
3,39,-80.333889,25.649444,584
4,30,-80.415,26.086389,207
4,31,-80.175833,26.121944,128
1,37,-80.681389,26.686667,213
4,40,-80.364444,25.828333,156
4,42,-80.286944,25.920556,147
4,43,-80.168056,26.024722,333
3,46,-80.129167,25.793611,2694
3,47,-80.238611,25.811389,121
1,49,-80.051667,26.711944,381
4,50,-80.160556,25.908611,187
4,52,-80.26,26.121667,456
4,53,-80.105556,26.136389,501
3,54,-80.383333,25.653056,81
4,55,-80.249444,26.268333,314
3,56,-80.294722,25.703889,184
3,57,-80.315,25.808333.21
3,58,-80.265278,25.788333,267
4,60,-80.25,25.891667,205
4,61,-80.090833,26.230278,147
4,64,-80.211667,26.0175,595
```

FIG. 7

```
ER,RBER,FER,BQ,TD,FREQ,TIME,MS,PRINT
DEV,FVC,RVC,TDRVC,FVC,RVC,RVC,RVC,RVC,RVC,ERR,ALIG 28.0069725,9412580201,T017C,MDVC-
15,0,1,0,2,0
28.0069725,9412580201,T017C,MDVC-
15,0,1,0,2,0
28.0069856,9412580201,T017C,MDVC-
15,0,2,0,2,1
28.0069856,9412580201,T017C,MDVC-
15,0,2,0,2,1
28.0070392,9412580201,T005B,MDVC-
2,0,4,0,2,1
28.0072014,9412580201,T005B,MDVC-
7,0,4,0,2,1
28.0072014,9412580201,T005B,MDVC-
7,0,4,0,2,1
28.0073900,9412580201,T005B,MDVC-
8,0,3,0,2,1
28.0073900,9412580201,T005B,MDVC-
8,0,3,0,2,1
28.0075761,9412580201,T005B,MDVC-
7,0,5,0,2,1
28.0075761,9412580201,T005B,MDVC-
7,0,5,0,2,1
592,9412580102,T005B
```

MOBILE TELEPHONE CELL TRAFFIC RECORDING
DIGITAL SIGNAL STRENGTH MEASURMENTS

| MSNB | CELL | DEV | SSFVC | SSRVC |
|---|---|---|---|---|
| 9412580201 | T017C | MDVC-1060 | 23 | 20 |

| SSSTDRVC | BERFVC | BERRVC | RBERRVC | FERRVC |
|---|---|---|---|---|
| 6 | 3 | 2 | 2 | 0 |

| BQRVC | TDRVC | FREQERR | TIMEALIGN | MSPOW |
|---|---|---|---|---|
| 6 | 3 | 1 | 0 | 2 |

| NCELL | NSSFFMC | MEASCHAN | VIND |
|---|---|---|---|
| T017A | 5 | 1260 | Y |
| T017B | 23 | 1272 | Y |
| T006B | 17 | 1300 | Y |
| T016B | 13 | 1305 | Y |
| T004A | 29 | 1251 | Y |
| T005B | 33 | 1302 | Y |
| T005A | 23 | 1290 | Y |
| T018A | 21 | 1294 | Y |
| T154B | 21 | 1303 | Y |

| TIMW | PRINTIND | FCODE |
|---|---|---|
| 11:08:27 | 0 | |

END

MOBILE TELEPHONE CELL TRAFFIC RECORDING CANDIDATE LIST FOR HANDOFF

| MSNB | CELL | TIME | FCODE | URGENCY |
|---|---|---|---|---|
| 9412580201 | T017C | 11:08:28 | | 0 |

| CANDCELL | CELLTYPE | NTYPE | RATING |
|---|---|---|---|
| T005B | 0 | STD | 0 |

END

*FIG.10*

XTEL LOG FILE
---------

DATE,TIME,LONGITUDE,LATITUDE,ALT,SPEED,HEADING,DPS_MODE,PHONE_TASK,TASK_DESC,CHAN,RSSI,MODTYPE,SLOT,CHANTYPE,SAT,DVCC,POWER,BER,BER_CODE,SBI,TA,CELL1.DISTANCE1,CELL2,DISTANCE2,CELL3,DISTANCE3,LOWER_CTOA,UPPER_CTOA,COCHA_RSSI,MARKER,CHAN_GRP,EVENT,EVINFO,BAND,LISTTYPE,LISTCT,CHAN1,RSSI1,CHAN2,RSSI2,CHAN3,RSSI3,CHAN4,RSSI4,CHAN5,RSSI5,CHAN6,RSSI6,CHAN7,RSSI7,CHAN8,RSSI8,CHAN9,RSSI9,CHAN10,RSSI10,CHAN11,RSSI11,CHAN12,RSSI12,CHAN13,RSSI13,CHAN14,RSSI14,CHAN15,RSSI15,CHAN16,RSSI16,CHAN17,RSSI17,CHAN18,RSSI18,CHAN19,RSSI19,CHAN20,RSSI20,CHAN21,RSSI21,CHAN22,RSSI22,CHAN23,RSSI23,CHAN24,RSSI24,CHAN25,RSSI25,REVISION
7/30/99,11:08:27,-82.3321883,27.9813839,9,40.3,86.9,G8,5,Conversation,1218,-93,D,3,V,3,5,2,0.87,3,0,0,,,,,,,14,15,-100,0,8,,,1,Neig,9,1284,-89,1302,-93,1300,-103,1255,-107,1317,-109,1303,-109,1314,-111,1305,-111,1315,-113,0,0,0,0,0,0,0,0,0,0,0,0,0,0,0,0,0,0,0,0,0,0,0,0,0,0,0,0,0,0,0,0,4
7/30/99,10:52:47,-82.3321883,27.9813839,9,40.3,86.9,G8,5,Conversation,1218,-93,D,3,V,3,5,2,0.84,3,0,0,,,,,,,14,15,-100,0,8,,,1,Neig,9,1284-89,1302,-93,1300,-103,1303,-107,1255,-109,1314,-111,1317,-111,1305,-111,1315,-113,0,0,0,0,0,0,0,0,0,0,0,0,0,0,0,0,0,0,0,0,0,0,0,0,0,0,0,0,0,0,0,0,4
7/30/99,10:52:48,-82.33219553,27.9813947,10,43.1,,87.0,G8,5,Conversation,1218,-93,D,3,V,3,5,2,0.84,3,0,0,,,,,,,-10,38,-137,0,8,,,1,Neig,9,1284-89,1302,-93,1300,-103,1303,-107,1255,-109,1314,-111,1317,-111,1305,-111,1315,-113,0,0,0,0,0,0,0,0,0,0,0,0,0,0,0,0,0,0,0,0,0,0,0,0,0,0,0,0,0,0,0,0,4
7/30/99,10:52:48,-82.3319553,27.9813947,10,43.1,,87.0,G8,5,Conversation,1218,-95,D,3,V,3,5,2,0.84,3,0,0,,,,,,,-10,38,-137,0,8,,,1,Neig,9,1284-83,1302,-93,1300,-101,1303,-105,1255,-109,1305,-111,1314,-113,1315,-113,1317,-113,0,0,0,0,0,0,0,0,0,0,0,0,0,0,0,0,0,0,0,0,0,0,0,0,0,0,0,0,0,0,0,0,4
7/30/99,10:52:49,-82.3317164,27.9814044,10,44.7,87.2,G8,5,Conversation,1218,-95,D,3,V,3,5,2,0.99,3,0,0,,,,,,,-10,38,-137,0,8,,,1,Neig,9,1284-83,1302,-93,1300,-101,1303,-105,1255,-109,1305,-111,1314,-113,1315,-113,1317,-113,0,0,0,0,0,0,0,0,0,0,0,0,0,0,0,0,0,0,0,0,0,0,0,0,0,0,0,0,0,0,0,0,4

*FIG.11A*

COMARCO FILE
---
13:20:00.8,26.677,-81.567
12:20:01.2,25.230,-81.456
..................................
..................................
13.21.00.3,28.655,-81.2128

FIG.13A

Time,Long,Lat,CellNo,SS,
12:41:29,28,6559300,-18.205792000,1353,-124
12:41:29,28,6559300,-18.205792000,201,-106
12:41:29,28,6559300,-18.205792000,32,-106
12:41:29,28,6559300,-18.205792000,321,-76
12:41:29,28,6559300,-18.205792000,323,-66
12:41:29,28,6559300,-18.205792000,831,-100
12:41:30,28,6559260,-18.205580000,323,-66
12:41:31,28,6559170,-18.205380000,321,-75
12:41:31,28,6559170,-18.205380000,321,-75
12:41:31,28,6559170,-18.205380000,323,-64
12:41:32,28,6559080,-18.205198000,323,-63
12:41:33,28,6558950,-18.204922000,321,-73
12:41:33,28,6558950,-18.204922000,323,-62
12:41:34,28,6558900,-18.204769000,321,-73
12:41:34,28,6558900,-18.204769000,321,-73
12:41:34,28,6558900,-18.204769000,322,-98
12:41:34,28,6558900,-18.204769000,323,-61
12:41:35,28,6558900,-18.204577000,1353,-124
12:41:35,28,6558900,-18.204577000,201,-105
12:41:35,28,6558900,-18.204577000,202,-106
12:41:35,28,6558900,-18.204577000,32,-105
12:41:35,28,6558900,-18.204577000,323,-63
12:41:35,28,6558900,-18.204577000,831,-99
12:41:37,28,6558970,-18.204219000,321,-73
12:41:37,28,6558970,-18.204219000,323,-67
12:41:38,28,6559000,-18.204044000,321,-74
12:41:38,28,6559000,-18.204044000,323,-67
12:41:38,28,6559000,-18.204044000,321,-74
12:41:38,28,6559000,-18.204044000,323,-67
12:41:40,28,6559020,-18.203683000,1353,-122
12:41:40,28,6559020,-18.203683000,202,-104
12:41:40,28,6559020,-18.203683000,32,-105
12:41:40,28,6559020,-18.203683000,321,-73
12:41:40,28,6559020,-18.203683000,322,-96
12:41:40,28,6559020,-18.203683000,323,-67
12:41:41,28,6559070,-18.203457000,321,-72
12:41:41,28,6559070,-18.203457000,323,-66
12:41:42,28,6559100,-18.203125000,321,-71
12:41:42,28,6559100,-18.203125000,323,-66

FIG.13B

```
v————————————— Record #      1: ————————————————v
05/10/99 13:22:05 ALM INF   4103  7  32           G         TC    457
          Call Monitor: Call Record has been Written in RAM disk
          Ph#:(407)9223002 Call clear by MS  -  mobile clear
v————————————— Record #      2: ————————————————v
05/10/99 13:22:04 ALM INF   4113  7  32           G         TC    457
          Call Monitor: Call RSSI value
          (407)9223002 cell 323 rrssi -77 attn 4 snr 40
v————————————— Record #      3: ————————————————v
05/10/99 13:22:04 ALM INF   4117  7  32           G         SRC
          Call Monitor: Adj. cell RSSI values from Scanning Rcvr.
          (407)9223002 Cell_id RSSI:/323 / -73
v————————————— Record #    264: ————————————————v
05/10/99 13:21:00 ALM INF   4117  7  20           A         SRC
          Call Monitor: Adj. cell RSSI values from Scanning Rcvr.
          (407)9223002 Cell_id RSSI:/201 / -98
v————————————— Record #    265: ————————————————v
05/10/99 13:21:00 ALM INF   4117  7  32           B         SRC
          Call Monitor: Adj. cell RSSI values from Scanning Rcvr.
          (407)9223002 Cell_id RSSI:/322 / -103
v————————————— Record #    266: ————————————————v
05/10/99 13:21:00 ALM INF   4117  7  83           A         SRC
          Call Monitor: Adj. cell RSSI values from Scanning Rcvr.
          (407)9223002 Cell_id RSSI:/861 / -96
v————————————— Record #    267: ————————————————v
05/10/99 13:21:00 ALM INF   4117  7  32           A         SRC
          Call Monitor: Adj. cell RSSI values from Scanning Rcvr.
          (407)9223002 Cell_id RSSI:/321 / -78
v————————————— Record #    268: ————————————————v
05/10/99 13:21:00 ALM INF   4117  7 135           G         SRC
          Call Monitor: Adj. cell RSSI values from Scanning Rcvr.
          (407)9223002 Cell_id RSSI:/1353 / -113
v————————————— Record #    269: ————————————————v
05/10/99 13:21:00 ALM INF   4117  7  20           B         SRC
          Call Monitor: Adj. cell RSSI values from Scanning Rcvr.
          (407)9223002 Cell_id RSSI:/302 / -100
v————————————— Record #    270: ————————————————v
05/10/99 13:21:00 ALM INF   4113  7  32           G         TC    457
          Call Monitor: Call RSSI value
          (407)9223002 cell 323 rrssi -72 attn 4 snr 40
v————————————— Record #    271: ————————————————v
05/10/99 13:21:00 ALM INF   4117  7  32           G         SRC
          Call Monitor: Adj. cell RSSI values from Scanning Rcvr.
          (407)9223002 Cell_id RSSI:/323 / -71
v————————————— Record #    272: ————————————————v
05/10/99 13:21:00 ALM INF   4117  7   3           B         SRC
          Call Monitor: Adj. cell RSSI values from Scanning Rcvr.
          (407)9223002 Cell_id RSSI:/32 / -115
```

FIG.14

METHOD FOR AUTOMATED UPDATE OF TELECOMMUNICATIONS DATA IN A WIRELESS NETWORK

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

The present invention broadly relates to wireless network methods and systems, and more particularly to methods and systems for gathering data, performing database updates, and/or generating report information associated with a wireless network.

2. Description of the Related Art

Telephone communication has seen phenomenal growth since its inception because of its extreme usefulness in today's world. Modem telephones include generic desktop telephone units, cordless telephones and more advanced cellular telephones (or "cell phones"). In contrast to a cordless telephone unit, a cellular telephone allows portability in that a cell phone operator can use the cell phone thousands of miles from home and is supported by a sophisticated telecommunications system.

A cellular service provider's network includes a number of interconnected cellular switches or mobile switching centers (MSC's) that facilitate cell phone portability in the network. The cellular network also typically includes a large number of cell sites, with each MSC generally serving more than one cell site. The cell phone operated by a mobile subscriber (MS) communicates with an appropriate base station over a radio link established between the base station and the cell phone. The base station, in turn, forwards signals received from the cell phone to the corresponding MSC for further processing and propagation. Similarly, the base station relays messages received from the MSC to the appropriate cell phone within the cell site served by the base station. Thus, the base station may be viewed as a conduit of messages exchanged between the MSC and a cell phone.

It is observed that the cellular service provider may add more cell sites (and base stations) or reconfigure existing cell site boundaries to cope with increased cellular traffic in the service provider's cellular network. The increased cellular traffic may have resulted from the new cell phone operators or from mobile subscribers signing up for the service provider's cellular services and operating within the network. Increased cellular traffic can also, of course, result from increased usage of cellular services by existing subscribers. The addition of new cell sites or reconfiguration of existing cell sites to accommodate increased cellular traffic requires that the new cell sites be "retuned") for effective communication with corresponding MSC's. The radio communication between a new (or existing) cell site and its associated MSC often needs to be monitored to evaluate whether the MSC recognizes the cell site. Also, any new MSC's added in the cellular network, or any MSC's already operational in the network, may need to be maintained and routinely checked for effective radio communication with a cell phone operative within the cellular network region served by a particular MSC.

In the telecommunications architecture developed under the "LUCENT" trade designation, for example, the advent of TDMA technology introduced a significant amount of new translations or software settings. Due to this increased number of translations or changes in software settings, entering retune information manually is rapidly becoming prohibitive from a productivity perspective. Retunes are typically performed during off-peak hours to minimize potential impact to the customer. Retunes usually involve nocturnal work performed by human technicians prone to mistakes caused by exhaustion and fatigue. There is a need, therefore, for a retune tool that employs automation to increase efficiency and cost-effectiveness of retunes within a wireless network.

In a cellular system, as new cells are being deployed, the frequency plan has to be continually modified. If a new cell is introduced between two existing cells, for example, information for the new cell and its neighbors needs to be modified. As a result, frequency retunes are often required to properly integrate the new cell into the existing system. Currently, retune is being performed manually, and it takes considerable time and resources to retune a site in this manner. Also, such manual procedures can introduce human errors that may further frustrate efforts to resolve problem analysis and resolution. Automating the retune process would enhance processing of updates of the database with new channel numbers and other information and also eliminate human errors.

In addition, when one or more fields in a call-specific database need to be changed, manually completing the updates can require a prohibitive amount of time. Such changes are also typically prone to human error occasioned by manual data entry operations. What is needed therefore are a method and system that can update the appropriate information in the database while reducing clerical errors associated with manual processes.

In addition, data related to calls occurring within a given geographical area are not always susceptible to effective reporting. Information related to fraudulent use, for example, of wireless technology and, more generally, to problems occurring within a wireless network is often separated into different data files. What is needed is a way to combine data files related to call data in a report format, such as a graphical representation, that can be readily analyzed to permit resolution of problems in a wireless network. Use of such reports is also needed across a variety of equipment that can be employed within a given wireless network.

SUMMARY OF THE INVENTION

In one embodiment, a method and system are provided for updating call-specific data in a database associated with operation of a wireless network. The method includes receiving user input related to a Lucent ECP form, and one or more fields of the form, for which changes are desired. The method also includes generating a script to update the form by identifying one or more values associated with call-specific data in the wireless network. The method also includes creating an apxrcv script based on the user input and the values associated with the call-specific data. Finally, the method involves executing the apxrcv script to update the form. This embodiment can also be implemented as a system for performing the method or on a computer-readable medium.

BRIEF DESCRIPTION OF THE DRAWINGS

FIG. 6 shows an excerpt of a log file used to generate a graphical representation;

FIG. 7 shows a modified file based on a log file in accordance with FIG. 6 that is ready for receipt by a thematic mapping software program;

FIG. 9 is a flowchart illustrating process steps employed by reverse mapping methods and systems;

FIG. 10 shows a sample Ericsson data log related to testing in a particular coverage area of a wireless network;

FIGS. 11A and 11B show a sample Xtel log file acquired from drive test data obtained in a particular coverage area within a wireless network;

FIGS. 13A and 13B show a sample log file related to use of a Comarco and Hughes arrangement in a wireless network;

FIG. 14 shows a sample log file related to use of a Comarco and Hughes arrangement in a wireless network; and, FIG. 15 shows a graphical representation plotted by signal strength for a given coverage area of a wireless network.

DETAILED DESCRIPTION

Figure 1:
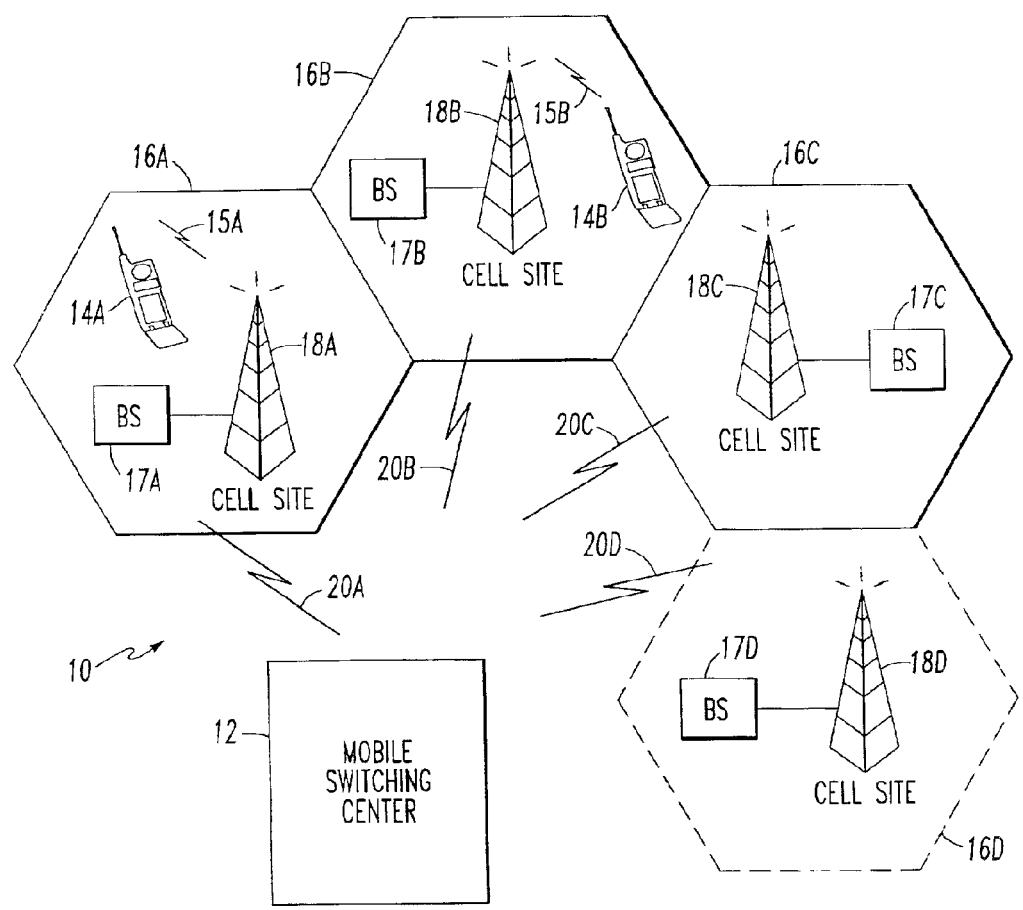
FIG. 1 shows a mobile switching center in wireless communication with a number of cell sites in a cellular service provider's network.

The following terminology is intended to provide guidance to one skilled in the art with the various embodiments disclosed herein. Use of a particular nomenclature, whether conventionally applied in the art or otherwise, is for purposes of illustration only and not intended to limit the scope of the present invention:

| Term | Definition |
| --- | --- |
| ECP | "Executive Cellular Processor" (sold by Lucent) - typically a 3B30D computer which is the main processor for the Lucent Technologies "AUTOPLEX 1000" cellular system |
| OMP | Operations and Management Platform (sold by Lucent) - OMP is an adjunct processor to the AUTOPLEX System 1000 that provides additional terminal support and off-line processing. |
| AUTOPLEX | A Lucent cellular product consisting of a Series II cell System 1000 site, a Digital Cellular Switch (DCS), and an ECP. |
| Base Station (Cell) | A radio transmission and processing component of certain wireless systems, such as the Autoplex 1000 system; a collection of components which provides an interface between the mobile unit and facilities of the switch. Typically includes radio transmitter/receiver equipment, antennas and computers. |
| Cell Site Trunk | A trunk which provides a talk path between the DCS and the Cell |
| 3B30D | A fully duplexed, fault-tolerant computer with 256 MB of physical memory. It serves as the main hardware component for the ECP and it contains the Input-Output Processor (IOP), the Central Processing Unit (CPU), the memory stores, and the Disk File Controller. |
| 5ESS | Electronic switching system sold under "Lucent" trade designation |
| Apxrcv | An "AUTOPLEX 1000" database management system |
| DBMS | Database Management System. Any software or system which organizes and manipulates information in a database |
| DB Form or Lucent form | (e.g., "ceqsu2", "ctm", etc.) - A collection of logically related information referenced by a key. A key may be a single field or multiple fields. Also, an image displayed on the RC/V terminal, used to enter and/or display the contents of a given database, including one or more screens. |
| Form | An image displayed on the OMP that is used to insert/update/review/delete the data contents of a database |
| Record | Identifies the information displayed on a given form for a particular key value |
| RC/V | Recent Change/Verify (Lucent). A type of software application which provides a user interface to the database management system. |
| AMPS | Advanced Mobile Phone System Uses Frequency Division Multiple Access (FDMA), whereby the RF Spectrum allocated for cellular phone systems by the Federal Communications Commission (FCC) is divided into 30 KHz-wide RE channels. These RE channels are allocated as setup channels or individual voice channels. The communication from mobile unit to cell site is termed as uplink (reverse path) and the communication from cell site to mobile unit is termed as downlink (forward path). |
| TDMA | Time Division Multiple Access (Uses the same FDMA 30-KHz voice Channel allocations as AMPS) - carries digital information that is time-division multiplexed into six "time slots". A pair of time slots can be used to support communications in uplink and downlink directions. |
| DCCH | Digital Control Channel. A channel used to deliver programming information to a mobile unit. |
| Channel | A pair of frequencies used for wireless communication. One channel is used for base station to subscriber transmission while the other is used for subscriber to base station transmission |

-continued

| Term | Definition |
| --- | --- |
| Channel Reuse | Refers to the simultaneous use of a single voice channel for multiple conversations in separate cells of the same service area |
| Voice Channel | A channel on which a voice conversation occurs and on which brief digital messages may be sent from a cell site to a mobile unit or vice versa |
| Setup Channel | A Channel used to transmit digital control information from a cell site to a mobile or vice versa |
| AVC | Analog Voice channel |
| ACC | Analog Control channel |
| Trunk | A port on a switch which connects to transmission equipment. It is used for transmitting andlor signaling between two entities, such as central offices or sections of the same switching system |
| RF Call Trace | A Lucent tool. It provides for call performance assessment from the mobile. By measuring the signal strengths of mobile calls ftom various cell sites, a system operator can analyze the quality of the radio environment |
| Tipdunix | A Lucent tool that is used to remove/restore radios, run diagnostics on radios, and the like. This tool is run from the ECP. |

DESCRIPTION OF VARIOUS LUCENT FORMS:

| Term | Definition |
| --- | --- |
| Ceqsu2 | Cell Equipage Setup. This form contains information concerning characteristics of the setup radio associated with each antenna face or the entire cell for a given cell site. |
| Dcch | Digital Control Channel. DCCH is used for transmission of control information and short user data messages between the cell and mobile. |
| CTM | Cellsite Trunk member (Analog). This form contains information on trunk members such as server group, physical antennas, voice radio channel, group, number, timeslot and beacon, trunk status, supervisory audio tone color code, and the like. |
| Tpptm | TDMA Packet pipe trunk member information. Same as CTM, except this form is used to store digital trunk member information. |
| Resel | Reselection list for control channels. |
| Fci | Face Code Information. This form contains information concerning the cell site in the handoff function based on 1) server group and 2) antenna face. That is, the neighbor list of MAHO (Mobile Assisted Handoff List) for a particular cell face is contained in this form. |
| LAF | Logical Antenna Face. A combination of a physical antenna face and a server group |
| Server Group | A group of voice radios at a dual cell site which serves either the larger or the smaller radius of the cell |
| Drive Testing | A test which involves driving a motor vehicle (with mobile transceiver) in a specific area of coverage while attempting to complete or monitor calls; a performance analysis activity used to find service-affecting problems |
| Cron | A scheduler which controls system activities so that they are performed at scheduled times |

MISCELLANEOUS:

| Term | Definition |
| --- | --- |
| Mapinfo | Software developed by Mapinfo Corp. that helps RE (Radio Frequency) engineers perform thematic mapping for visualization of telecommunications data |
| PhonePrint | A software package of Corsair Communications that helps engineers to access data from the PhonePrint Fraud Control Database. |
| BER | Bit Error Rate. The percentage of bit errors that occur during uplink or downlink transmission; a measure of digital signal quality |
| FER | Frame Error Rate. The percent of received frames that were deemed to have one or more corrupted bits in a frame |
| MAC | Mobile Attenuation Code |
| RSSI | Received Signal Strength Indication - represents the received signal strength for a given channel |
| Time Advance | Indicates the user's timing offset with respect to the time slot |

ERICSSON-SPECIFIC TECHNOLOGIES:

| Term | Definition |
| --- | --- |
| OSS | Operations and Support System. The function of OSS is to assist the network operator in managing the telecommunications network. The OSS can communicate with and control many remote pieces of equipment making it possible to perform many network management tasks from a central location. |
| CNO | Cellular Network Operations. Through Command Handling and fault Management application, it supports centralized operation Command Handling; CNO interacts with the network elements through Man Machine Language (MML) commands. The Command Handling window in OSS can be used to issue MML commands to modify database, review database, add/delete database records, and other related functions |

Referring now to FIG. 1, there is shown a mobile switching center (MSC) or a cellular switch 12 in wireless communication with a number of cell sites 16A, 16B, 16C, 16D, in a cellular service provider's network 10. Each cell site 16A–16D may include a base station (BS) 17A–17D that communicates over radio links (e.g., radio links 15A and 15B) with cellular telephones (e.g., cell phones 14A and 14B) within that cell site using a corresponding wireless transmission tower 18A–18D. The mobile switching center (MSC) 12 is a functional entity that represents an automatic wireless message switching system. The MSC 12 is in direct wireless communication with the base stations 17A–17D via corresponding radio links 20A–20D. The MSC 12 receives numerous signals from the base stations 17A–17D, such as call initiation signals, call termination signals, voice communication signals, etc., transmitted by the cell phones (e.g., the cell phones 14A and 14B) to their nearest base station transmission towers (e.g., towers 18A and 18B). The MSC 12 may be distinguished from an MTSO (mobile telephone switching office) (not shown), which may refer more to the physical architecture of the wireless switching office including switching hardware, the physical building, etc. The MSC 12 typically provides an interface for user traffic between a cellular network (e.g., the cellular telephone network 10) and other public switched telephone networks (PSTNs) or other MSCs in the same or other networks.

It is noted that the terms "mobile subscriber", "network subscriber" and "mobile user" are used interchangeably hereinbelow. A "mobile subscriber (MS)" (not shown) may be a human individual who has subscribed to one or more mobile wireless services. The term "mobile subscriber", as used herein, also includes a mobile service user who uses the subscribed wireless service(s) with a cellular telephone. The term "cellular telephone" may include a mobile telephone handset (e.g., the handset 14A) or a computer equipped for wireless communication (not shown) or any other similar cellular telecommunication device that is capable of voice and/or data communication in a wireless network. Further, "mobile communication" may include voice, data or any other information communicated via a mobile wireless network. The terms "wireless network" or "mobile wireless network" as used herein are contemplated to include analog or digital cellular mobile networks irrespective of the underlying transmission technology, e.g., CDMA (code division multiple access), TDMA (time division multiple access), etc., and any other radio network that employs intersystem messaging (e.g., IS-41 based messaging scheme) as part of mobile wireless communication.

The MSC 12 provides basic switching functions and coordinates the establishment of calls to and from cellular subscribers. Thus, the MSC 12 is responsible for various call processing as well as mobile subscriber mobility management functions. As part of its call processing functions, the MSC 12 may receive certain mobile subscriber-specific data from the base stations served by the MSC 12. The base station may receive the subscriber-specific data when a mobile subscriber (or cell phone operator) initiates a telephone call using a cellular telephone. Thus, the subscriber-specific data may get communicated to the MSC 12 via a series of radio links such as, for example, via the radio links 15A and 20A when a telephone call is placed using the cell phone 14A. The subscriber-specific data may include the MIN (Mobile Identification Number) and the ESN (Electronic Serial Number) for the cellular telephone being operated by the mobile subscriber, the destination telephone number for the telephone call, one or more radio channels assigned during the telephone call by the respective base station in the wireless network and the cell site from which the mobile telephone call was placed.

The base station 17A–17D in each cell-site 16A–16D receives radio communications from cellular telephones operative in the corresponding cell-site. For example, the base station 17B in the cell-site 16B communicates with the cell phone 14B via radio signals transmitted and received (over the radio link 15B) by the base station transmission tower 18B. Thus, a base station provides a radio interface between a wireless network and the cell phones operative within the geographic region covered by the base station. A base station controls radio resources and manages network information (for example, radio channel assigned during a call) that is required to provide telecommunications services to the mobile subscriber. A base station (e.g., the base station 17B) consists of one or more radio transceivers, one or more transmission towers (e.g., the transmission tower 18B), and one or more radio transceiver controllers serving one or more cells. A cell is the geographic area defined by the telecommunications coverage of the radio equipment located at a given cell site. A cell-site, e.g., the cell-site 16B, is the physical location of a cell's radio equipment (i.e., the base station 17B) and supporting systems. A base station for a cell-site incorporates radio functions and radio resource control functions.

As noted earlier hereinbefore, the cellular service provider may reconfigure cell-site boundaries or may even add a new cell site depending on the growth of the cellular telephone communication traffic. In FIG. 1, cell site 16D is shown dotted to indicate that the site has been added to the cellular service provider's network 10. Thus, the service provider may add many more such cell sites, remove some of the existing sites, or reconfigure cell site boundaries for some or all of the existing cell sites to accommodate the increased cellular customer base. Additionally, or alternatively, the cellular service provider may upgrade or replace the existing MSC with a more technologically advanced one to better serve the growing needs of the mobile subscribers. In any of such events, it is desirable that a technician employed by the cellular service provider be able to monitor, maintain, or diagnose the MSC 12 in real time to ascertain whether the MSC 12 properly functions vis-á-vis the cell sites served by the MSC 12. For example, it may be desirable to test whether the MSC 12 recognizes a new cell site when the new site becomes operational, or whether the subscriber-specific data originating from a cell phone (e.g., the cell phone 14A) reach the corresponding MSC (i.e., the MSC 12) and whether the MSC recognizes that data for further processing. Sometimes, testing of the MSC 12 may be necessary when a mobile subscriber complains about not being able to operate the subscriber's cell phone in certain cell sites or regions of the service provider's network 10.

Figure 2:
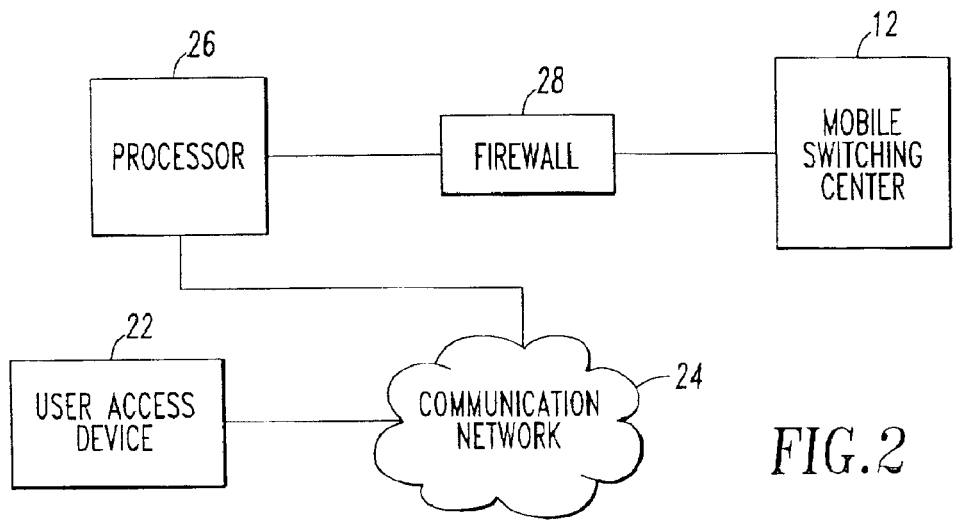
FIG. 2 illustrates an arrangement for acquiring and processing data from and in connection with the mobile switching center.

Referring now to FIG. 2, an arrangement is shown for accessing the mobile switching center 12 to interact and acquire data. The MSC 12 may be accessed using a processor 26 (e.g., an ECP) with a user access device 26 (e.g., an OCP). The user access device 22 may be present at a location that is physically different from that of the MSC 12. For example, the MSC 12 may be physically installed in city A, whereas the user access device 22 may be in city B. In this case, the user access device 22 can be connected to the MSC 12 via a communication network 24. The communication network 24 facilitates data communication between the MSC 12 and the user access device 22, and includes a combination of wire line and wireless networks such as, for example, a WAN (wide area network), a MAN (metropolitan area network), the Internet, a wireless local loop, a Bluetooth-based wireless LAN (local area network), etc. The user access device 22 may be a general-purpose PC (personal computer), a computer workstation, or a dedicated portable unit that is capable of data communication over the communication network 24.

In the arrangement illustrated in FIG. 2, the MSC 12 is shown connected to the processor 26 via a firewall 28 to prevent unauthorized users from accessing the processor 26 (as described hereinbelow) during maintenance and testing of the MSC 12. As is known in the art, the firewalls provide a level of security in data communication over a communication network. However, in an alternative embodiment, the firewall 28 may be absent if so desired by the cellular service provider. The processor 26 is a computer system equivalent to a system such as, for example, the ECP product sold under the "Lucent" trade designation. Software instructions reside on the processor 26 for execution by the processor 26. The execution of this software can be initiated from the user access device 22, which can be an OMP, for example, or another suitably equivalent device for working in association with the processor 26.

In addition, it should be noted that the software as employed herein can be initially stored on a computer-readable storage medium (not shown), e.g., a floppy diskette, a compact disc (CD), a magnetic tape cartridge, or any similar magnetic/electromagnetic storage medium. Thereafter, the software can be loaded onto a suitable operating system for execution within the system.

In a first aspect, it can be appreciated that RF engineers often need to change one or more fields in Lucent ECP forms to correct, for example, customer-reported problems. If the same field in several records in a form needs to be changed, which can be a frequent occurrence, manually changing the forms can be a tedious job that is prone to human error during data entry. A software "script" would therefore be useful to update one or more fields in several records in a form.

In one embodiment, an arrangement is illustrated for performing automatic script generation to aid Lucent ECP database updates. When one or more fields in an ECP form need to be changed and this change needs to be done for several records in the form, manually performing updates can require a prohibitive amount of time and effort prone to human error. A script can therefore be provided that can perform this update of fields in an ECP database form. It can be appreciated that an effective software program for these types of updates can generate the script necessary to update one or more fields in all of the ECP forms for which the user has permission to update.

Figure 3:
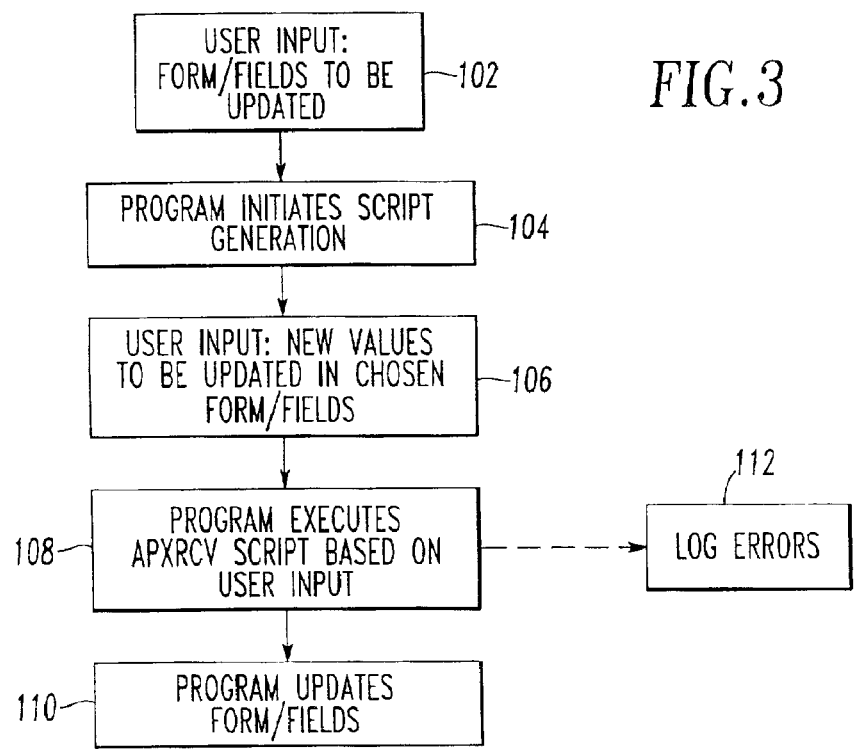
FIG. 3 is a flowchart of process steps involved in an automated database update method and system.

Referring now to FIG. 3, a user enters the particular Lucent ECP form and the field or fields in step 102 for which changes are desired. An example of this step can be provided as follows:

EX: Enter form you want to change→cell2

Enter field(s) you want to change→cgsa cstat (In this example, the user wants to change the fields "cgsa" and "cstat" in form "cell2").

Following the preceding example, the program takes the above user input and begins to generate a script in step 104 to update the "cell2" form. The user then supplies an input data file in step 106 with, for example, values of cell number, cgsa and cstat (all in one line with fields separated by a space as shown in the following example):

```
76 1 e
209 2 g
229 1 e
74 2 e
109 1 e
110 2 e
END
```

The script created now uses this file as input and creates an apxrcv script in step 108 which, for purposes of the "76 1 e" entry in this example, appears as follows:

cell2 u csno=76 cgsa=1 cstat-e u EXIT u

This apxrcv script can then be used to update the "cell2" form in step 110. An example of a command that executes this step is provided as follows:

apxrcv-text-brief-ignwarn-txtelog c<cell2.up (In this example, "cell2.up" is the apxrcv script generated by the program. In addition, if there are any errors while running the script, these errors can be logged in step 112 in the "errfil" file).

In addition, the script provided herein can use periodically-generated Lucent reports to obtain a key field or fields for all the records in the form that the user wants to update. Key fields are usually necessary to update each record in the form. The software program that generates these scripts can be called "script.gen" for sake of illustration. The "script-.gen" functionality generates an apxrcv script that updates the selected form. This apxrcv script is a Lucent tool to read/update/insert/delete Lucent form records.

EXAMPLE

Execution of "script.gen" Software

The following illustration demonstrates one particular embodiment of the execution of the "script.gen" program discussed hereinabove. The terminology employed herein is intended to show only one aspect of the software implementation and operation. This example is not intended to limit the scope of the present invention. For convenience of disclosure, the example is presented as a series of steps to be performed by one skilled in the art in executing the "script-.gen" software:

Step 0. Install script.gen in the OMP/ECP in the directory where installation is desired. Change the mode of script-.gen to executable by typing in: chmod 744 script.gen. The script can be installed in the OMP, if the Lucent "apxrcv" command and the Lucent ECP databases reside in the OMP. Otherwise, the script should be installed in the ECP for execution.

Step 1. Login to the OMP/ECP (if apxrcv scripts can be run from OMP log into the OMP, otherwise log into the ECP).

Step 2. Type /home/rftools/script.gen (If script.gen is not stored in /home/rftools use the directory in which it is stored in).

Step 3. When the program asks the user to input the form to be changed, the Lucent form is selected (e.g., cell2, ceqcom2, ceqface, etc.). The following forms, without limitation, can be supported: cell2, ceqcom2, ceqface, ceqsu2, ctm, dcch, ecp, fci, resel and tpptm.

Step 4. Next the program requires the user to input the field or fields for modification. The user can enter multiple fields by separating each field by a space (e.g., f1=10 and f2=50). In the example above, the user wants to set f1 to 10 and f2 to 50). The program needs the user to input the field name as it is defined in the database. The field names in forms can be obtained as follows:
 a) Log into OMP/ECP
 b) Type in apxrcv-text-fields
 c) Enter the form for which field names are desired
 d) The apxrcv program displays the field names for the form desired
Example Session:
wpb_ompl iyer>apxrcv-text-fields
AUTOPLEX Cellular System RCV (ODIN)—Data Entry
Enter Form Name (or?): dcch
Keys are:
1) csno
2) vrno
Data Fields are:
3) vrchnl
4) dvcc_t
5) hwtype
6) dstat
7) ant
8) tr_ant
9) lacnum
10) frame
11) shlf
12) slot Likewise, one can locate the field names for other forms as desired or needed.

Step 5. The program script.gen runs and creates a script file name FormName.up (if the user wants, for example, to update the form "cell2" the program creates the script with name, "cell2.up") in the current directory.

Step 6. To run the script in check mode (i.e., run to check for errors without updating the database) type as follows:
 apxrcv-text-brief-ignwarn-txtelog errfil-check<cell2.up (or whatever the script file name is). The script runs in the check mode, and if there are any errors it will log those errors in the "errfil" file.

Step 7. To run the script and update the database, type as follows:
 wpb_ompl iyer>apxrcv-text-brief-ignwarn-txtelog errfil<cell2.up It can therefore be appreciated that this process provides improvements in automated form updates with minimization of errors caused by manual data entry.

In another aspect, a method and system can be provided to perform digital retune on a wireless system periodically for the following primary reasons: when a new cell is installed; and when radios are added to the existing cell to satisfy increased traffic needs; when analog radios are removed for substitution by digital radios. Retuning of the system must be done after one of the above events, since channels in a system are reused within the system. To avoid interference, channels used in a first cell are typically not used in neighboring and nearby cells. In addition, when a new cell is installed, it needs several channels. Hence, channels used by a new cell that are not adjacent or nearby the cell can be reused in the new cell. Hence, the retune process permits this channel reuse to be employed to advantage. In summary, retune involves changing the channel numbers used by a given cell.

In general, retune involves modifying the channel number field in the following forms: ceqsu2, dcch, ctm, resel and fci.

Updating the forms ceqsu2, dcch and ctm is typically straight forward and can be performed effectively by scripts updating the channel field in these forms. Updating the resel and fci forms, however, is more complex. For these forms, the program has to search and locate all the occurrences of the cell/face in the MAHO (handoff) list and change channel numbers to the new channel numbers. Since, as discussed above, the same cell can be neighbor to several other cells, the program first goes through all the fci and resel forms to determine in which records the cell/face is being referenced. The program then generates a script to change the channel number in all the appropriate records.

In this aspect, a method and system are provided for digital retune programming of a wireless network using Lucent equipment and functionality. With the advent of the TDMA technology, a significant amount of TDMA related fields were introduced to the apxrcv forms. A large portion of these are related to the DCCH. To manually change all of the DCCH related fields would take an inefficient amount of time (approximately 15 minutes per site). It is not uncommon to have to retune multiple sites (more than five) to properly integrate a new site. As a result, a tool is needed to automate this process. A script eliminates the human error introduced as these retunes are usually performed under nocturnal conditions when a human worker is more susceptible to making mistakes by entering data manually.

The digital retune system takes two files with CTM (TPPTM) and DCCH information from the user and generates scripts to update the digital control channel number to a new value in the following ECP forms: ceqsu2, dcch, ctm, resel and fci. Also, scripts are generated for removal and restoration of radios that are needed when a retune is required. The TDMA retune method and system can be run in "check mode" to simulate what would happen on the live system. This "check mode" allows the user to forecast and eliminate many potential problems.

The TDMA retune method and system therefore significantly reduce the time required to perform retunes and minimize human errors introduced by manual entry. This also reduces the amount of time required to perform tasks such as new cell deployments, new cell integration and traffic additions. Use of this TDMA retune method and system also minimizes potential adverse impact on the customer, and this can lead to a more satisfied customer base.

Figure 4A:
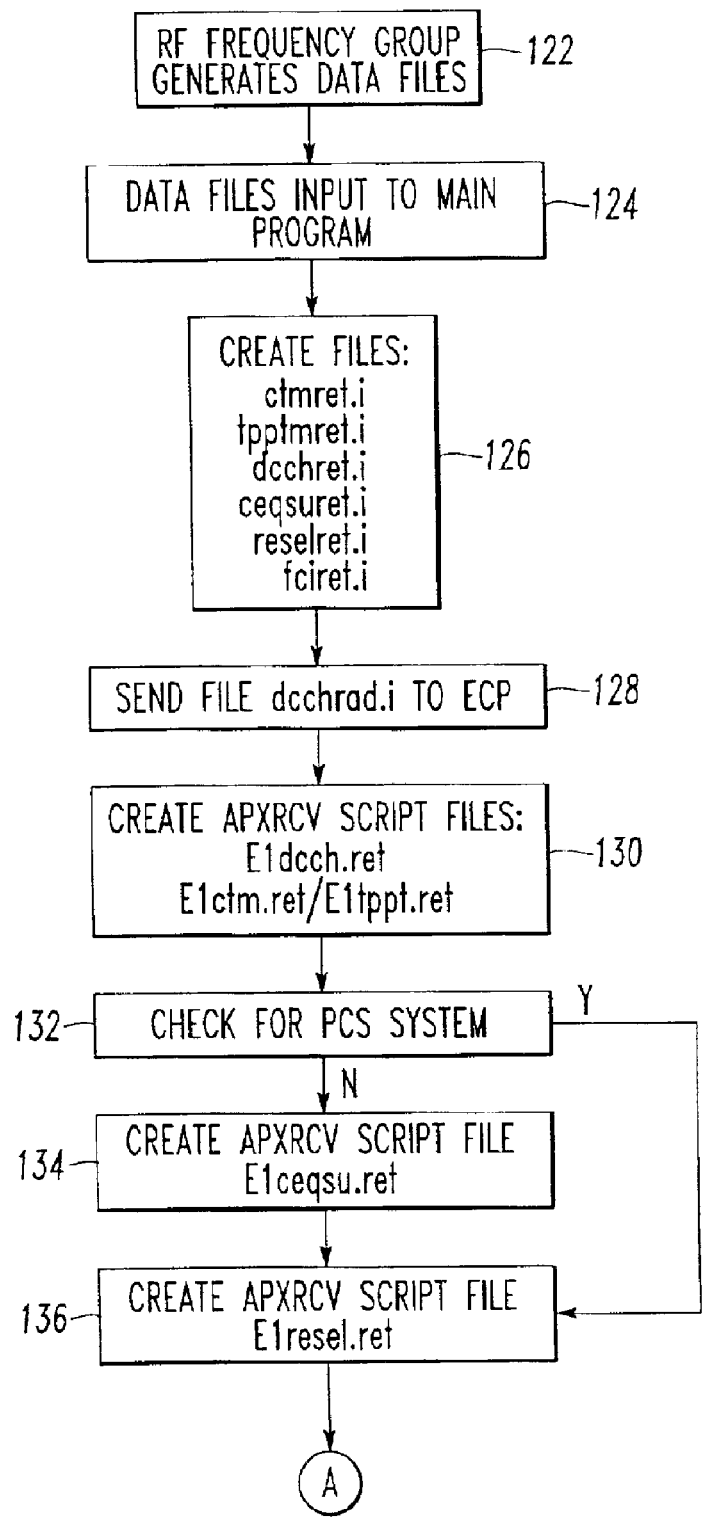
FIGS. 4A and 4B include a flowchart of process steps employed in an automated retune method and system.
Figure 4B:
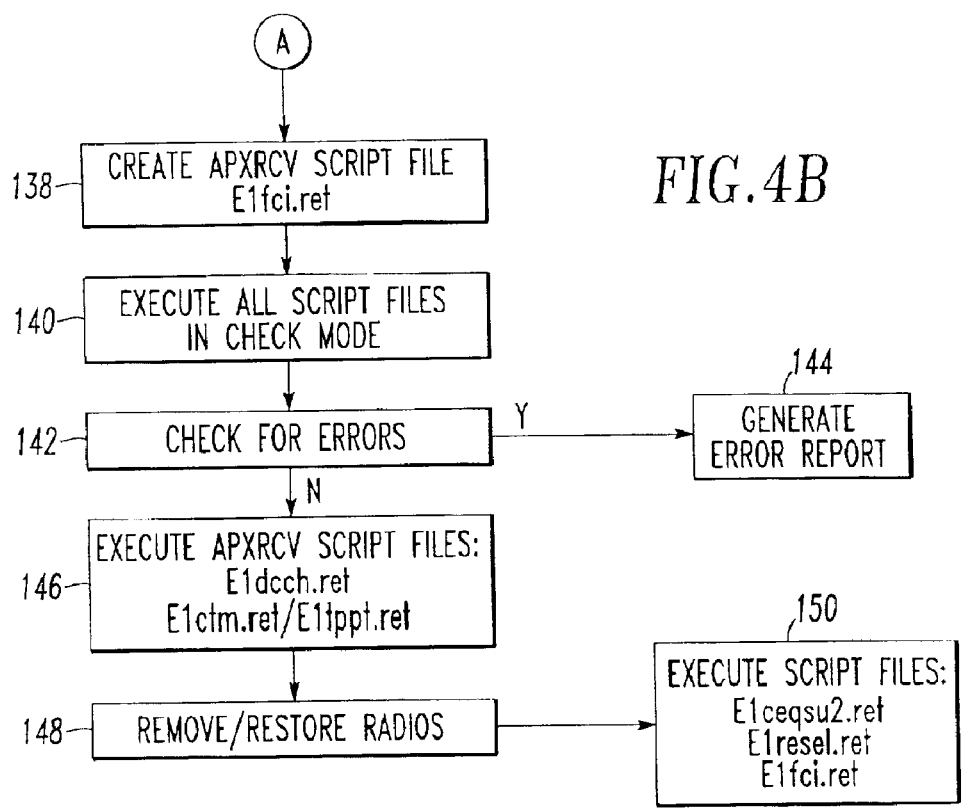

Referring now to FIGS. 4A and 4B, in this aspect, an RF group generates two input files in step 122: a DCCH file (all control Channel changes) and a CTM/TPPTM file (all voice channel changes). These two files are then input to digtunes in step 124, which is the main program that calls other programs to do specific tasks (the digtunes program is typically run from the OMP).

In step 126 the files ctmret.i/tpptmret.i, dcchret.i, dcchrad.i, ceqsuret.i, reselret.i, and fciret.i are created. The file dcchrad.i is sent in step 128 to the ECP (this file has cell and radio number in each line). This file can be input to Tipdunix to remove/restore radios from/to the wireless network at a subsequent time.

The program calls a dcchret.s script and provides it with the dcchret.i file in step 130. The dcchret.s script creates the apxrcv script file Eldcch.ret, where El stands for ECP 1. The program calls a ctmret.s/tpptmret.s script and inputs to it the ctmret.i/tppimret.i file. The ctmret.s/tpptmret.s file then creates the APXRCV script file Elctm.ret/Eltpptm.ret, where El stands for ECP 1.

The program determines whether a PCS system is being returned in step 132. If not, the program calls ceqsuret.s script and inputs to it the ceqsuret.i file in step 134. The ceqsurel.s file then creates the apxrcv script file Elceqsu.ret, where El stands for ECP 1. Otherwise, if the program determines that a PCS system is returned, then the program calls a reselret.s script and inputs to it the reselret.i file in step 136. The reselret.s script creates the apxrcv script file Elresel.ret, where El stands for ECP 1.

Next, the program calls a fciret.s script and inputs to it a fciret.i file in step 138. The fciret.s script creates the apxrcv script file Elfci.ret, where El stands for ECP 1. The program executes all apxrcv script files (i.e., Eldcch.ret, Elctm.ret/Eltpptm.ret, Elfci.ret, Elceqsu2.ret and Elresel.ret) in check mode in step 140. No updates are made to the database or databases at this stage. If errors are detected while the program is running in check mode, a report of these errors is generated in step 144. This report permits, for example, a frequency-planning engineer to correct the input files and re-start the process of generating scripts. Otherwise, the program continues with execution of scripts in step 146 by running a digtunel.s script. This script executes the apxrcv scripts Eldcch.ret and Elctm.ret/Eltpptm.ret to modify channels in the forms dcch and cim/tppim.

A user can then log into the ECP and run the command radiormv.s in step 148. This script removes the list of radios contained in the file dcchrad.i. Next, the user can run the command radiorst.s. This script restores all the radios contained in file dcchrad.i. Finally, in step 150, the user can exit ECP, log into OMP, and run the script digtune2.s. This script executes the apxrcv scripts Elceqsu2.ret, Elresel.ret and Elfci.ret to modify the channel filed in forms ceqsu2, resel and fci.

EXAMPLE

Procedure for Execution of TDMA (DCCH) Retune Scripts

The following illustration demonstrates one particular embodiment of the execution of the retune system and method discussed hereinabove. The terminology employed herein is intended to show only one aspect of the software implementation and operation. This example is not intended to limit the scope of the present invention. For convenience of disclosure, the example is presented as a series of steps to be performed by one skilled in the art in executing the retune software:

Section 1

The following scripts should be resident in the following directories in ECP and OMP for the retune system to work properly.

ECP Scripts: The scripts fciret0.s, resel.s and the input files fciret.i, resel.i1 and resel.i2 should reside at /user/rftools. Also, the scripts radiormv.s and radiorst.s should reside under /user/rftools.

OMP Scripts: The scripts reselpp.s and fciret1.s reside under /home/rftools or some other common directory or bin. The following other scripts reside under /home/rftools:

Digtune.o, Digtune.s, digtune1.s, digtune1.o, digtune2.s, digtune3.s, ceqsuret.s, dcchret.s, ctmret.s, tpptmret.s, reselret.s, and fciret.s. All the scripts should be in executable mode (755 or 777).

Section 2

The following is the procedure for executing the TDMA (DCCH) retune scripts. The TDMA (DCCH) retune scripts update the digital control channel number in the following apxrcv forms: ceqsu2, dcch, ctm, resel and fci to the new value. The procedure is relatively straight forward in the case of ceqsu2, dcch and ctm forms. The scripts take two input files (dcch input file and ctm input file), and update the pertinent fields in the ceqsu2, dcch and ctm forms. In the case of the resel and fci forms, the procedure is more complex. The scripts take the cell number (cell) and antenna face number (face) from the DCCH input file and search through the resel and fci forms for occurrences where they are used as neighbor cells (Reselection & MAHO lists). Next, the program updates the channel numbers to the new value for all of those occurrences. Lastly, the DCCH radios are removed and restored for the changes to take effect.

Section 3

In order for generating scripts to update fci and resel forms, the following scripts can be run in ECP and OMP on a periodic basis, such as a daily basis. In the case of Region 1, the script tdmaq that is run in all ECP's takes care of this. In the other regions, the scripts fciret0.s and resel.s run in the cron in the ECP every night. The script fciret0.s pulls out MAHO information from fci form and stores it in the file fciret.dbx. The input file fciret.i must be present for the script fciret0.s to run. The script resel.s pulls the fields from reel form and stores them in the file resel.dch. The input files resel.i1 and resel.i2 must be present in the same directory as resel.s for it to execute. Sample cron commands to add to ECP are given below:

1022* * */user/rftools/fciret0.s

3022* * */user/rftools/resel.s

The next step involves adding commands to cron to copy the files fciret.dbx and resel.dch from ECP to OMP and put them under /home/pace/rje. The following example shows sample commands to add to the OMP:

105 * * *3bfetch/user/iyer/TDMA/fciret.dbx

155 * * *3bfetch/user/iyer/DCCH/resel.dch

The final step in the preprocessing involves running the scripts reselpp.s and fciret1.s in the OMP. The script fciret1.s takes fciret.dbx as input, calculates the screen and row number where MAHO cells are present and outputs MAHO information, Screen Number and Row number to /home/pace/rje/fciret.dbx. (In Region 1 this file is named fcire$ECP.dbx, where $ECP is the ECP number). The script reselpp.s does a similar function with the resel form. The following is an example of cron commands to run the above-mentioned two scripts:

30 5 * * */home/rftools/reselpp.s 00 6 * * */home/rftools/fciret1.s

Section 4

Three steps are involved to execute the TDMA (DCCH) retune scripts. In the first step, two input files (DCCH and CTM input files) are generated by the RF Engineer performing the DCCH retune(s). These files contain all pertinent information on the faces in which the DCCH retune(s) are occurring. These input files are used to generate input for the following apxrcv forms: ceqsu2, dcch, ctm/tpptm, resel and fci. Below are samples of each of these files: (the first line below—"dcs cell ra face channel" should not be entered in the actual input file; it has been provided here for illustration purposes only).

| DCCH Input File: | | | | |
| --- | --- | --- | --- | --- |
| dcs | cell | ra | face | channel |
| 2 | 12 | 64 | 1 | 723 |
| 2 | 12 | 94 | 2 | 753 |
| 2 | 12 | 124 | 3 | 741 |
| 2 | 18 | 68 | 1 | 776 |

-continued

CTM Input File:

| dcs | cell | tg | tm | channel |
|---|---|---|---|---|
| 2 | 12 | 312 | 2 | 723 |
| 2 | 12 | 312 | 3 | 723 |
| 2 | 12 | 312 | 101 | 750 |
| 2 | 12 | 312 | 102 | 750 |
| 2 | 12 | 312 | 103 | 750 |
| 2 | 12 | 312 | 104 | 777 |

Note: First line of input files should be data only (no blank lines, column headings, etc.).

The above input files can be either comma-separated fields (e.g., a .csv file) or space-separated fields (e.g., "2 12 312 2 723"). If the input files are comma separated, the script "digtune.s" automatically converts that input file to a space separated fields file.

If the input files are created in environments other than the OMP's and transferred to OMP's using FTP or other tools, steps must be taken to ensure that the input files do not contain any control characters. If the file is transferred using "Procomm Plus 3" software or its equivalent, the following must be done to ensure that there are no control characters: From the "Procomm Plus 3" FTP window, select FTP. Click on "File Transfer Mode". Select "ASCII". After this is completed, proceed to transfer the file.

The next step involves taking the above input files and creating scripts to update the following apxrcv forms: ceqsu2, dcch, ctm, resel and fci. For PCS markets, no ceqsu2 scripts are generated.

The final step involves taking the above input files and creating scripts to update the following apxrcv forms: ceqsu2, doch, ctm, resel and fci. Again, for PCS markets, no ceqsu2 scripts are generated. The final step also involves the execution of the scripts by feeding the scripts as input to apxrcv. After the execution of the scripts, the channel numbers in all of the above forms will be changed to the new values and the TDMA (DCCH) retune will be complete.

Steps for Invoking the Proper Scripts to do a Desired Function are as Follows:

1. Log onto the OMP. Select "Miscellaneous Applications". Select "OMP Shell". Once in the "OMP Shell", the user must be sure to be in the same directory as the DCCH and CTM input files. Once in the directory where the DCCH & CTM input files are stored, type the following: /home/rftools/digtune.s (if the cells that are returned are still VIC cells, run digtune.o instead).
2. The script prompts for the names of the DCCH and CTM input files. Also, the script will ask the question: PCS market? If answered with "y", no scripts will be generated to update the "ceqsu2" form. Then the script starts generating inputs for all the forms that are being updated. The input files ceqsuret.i, dcchret.i, ctmret.i/pptmret.i, reselret.i and fciret.i will be generated in this step. If digtune.o script is executed, ctmret.i file will be generated. If digtune.s is executed, tpptmret.i will be generated instead. In addition, it will send the file dcchrad.i to ECP. (NOTE: The user must have permission to use "3bsend" command for this to happen). This file will be used later to remove and restore the DCCH radios on the faces being retuned. Next, the above input files are used to generate scripts to update all the forms. The following programs reside under/home/rftools to accomplish this: ceqsuret.s, dcchret.s, ctmret.s, reselret.s and ficiret.s. The following scripts are generated by the above programs: Elceqsu2.ret Eldcch.ret, Elctm.ret (or Eltpptm. ret if distune.s is executed), Elresel.ret and El fci.ret.
3. After this is done, the scripts are executed in check mode (no updates to the database will be made in this mode) and the results placed in the current directory in the following files: dccherr, ctmerr, ceqsuerr, reselerr and fcierr. By looking at these files, one can discover whether any part of the script will fail when executed. If there are error messages in these files, they can be analyzed and, if necessary, the input files (DCCH and CTM) corrected. Changes to the input files result in steps 1 through 3 being executed again.
4. Next, the user enters the following command from the current directory:
   /home/rftools/digtune1.s (if the cells that are being retuned are VIC cells run digtune1.o instead). This calls apxrcv with the proper input scripts to update the dcch and ctm forms.
5. After the dcch and ctm form updates are complete, enter the following command:
   /home/rftools/ecp
   Type in ~sh, after you see the following prompts:
   Connection Established
   A REPT APXSHL TERMINAL IN SERVICE
   This will take the user to the ECP root directory. Go to home directory (e.g: /home/iyer) where the file dcchrad.i is stored.
6. Enter the following command:
   /user/rftools/radiormv.s
   This script will remove all the radios contained in the file dcchrad.i.
7. Enter the following command:
   /user/rftools/radiorst.s
   This script will restore all the radios contained in dcchrad.i.
8. After all the radios are restored, enter "exit". Next enter "Ctrl-D". This will take the user back to the OMP.
9. Enter "exit" again. Go to OMP shell and press the Enter key. Go to the directory where CTM and DCCH input files are stored. Type the following command:
   /home/rftools/digtune2.s
   This will update the following apxrcv forms: ceqsu2, resel and fci.
   In the case of PCS markets, run the command,
   /home/rftools/digtune3.s. This will update only the forms, resel and fci.
   This finishes all the database updates required for the TDMA (DCCH) retune.

It is important to look at the error files after all updates are completed to ensure there are no error messages.

In another aspect, a method and system can be provided for digital retuning of a wireless network containing equipment sold under the "Ericsson" trade designation. Again, automating the retune process speeds update of the database with new channel numbers and other information and also reduces human errors. Scripts can be scheduled to run at off-peak times that require an insubstantial amount of human intervention in their execution.

In this method and system, a retune operator supplies an input file with details such as, for example, Cell Number, Device Number, New channel number, and the like. The program takes this input file and generates scripts to do the retune. The Ericsson equipment employs an OSS as compared to the OMP employed by Lucent equipment discussed hereinabove. A Command Handling Window in the Ericsson equipment permits a user to enter commands associated with updates to wireless network information. Commands particular to Ericsson equipment, when applied in accordance with the methodology described above for Lucent equipment, can be demonstrated by the following Ericsson retune example:
blodi:dev=MDVC-1001; (block a device)
mtcle:cell=T200A,chnr=1315; (change the channel number)
blode:dev=MDVC-1001; (deblock a device)

With regard, for example, to the channel number change command, an input file can be generated as follows:

| Cell # | New Channel # |
|--------|---------------|
| T200A  | 1315          |
| T200B  | 1316          |
| T115A  | 1000          |

This input file translates, in the case of the T200A cell number, into the above-referenced channel number change command. This command is input to the Command Handling Window of the OSS of the Ericsson equipment. The command generates a script that updates the appropriate information in the wireless network to reflect retuning of the system.

In another aspect, a method and system are provided for use with the "Corsair" system for fraud prevention in cell sites. The method and system take the tear down report from Corsair's "Phoneprint" system and generate a report that includes relevant cellular phone information. The Phoneprint generates a list of call tear downs on a periodic basis. The output has information such as Date, Time of Call, Site ID, ESN of the fraudulent mobile, telephone number called, and the like. A program is provided that takes the above output and generates another report that has Cell Number and total call tear downs for that site for that month. The output file is fed as input to the "Mapinfo" software program and a graphical representation Tear Down Report is generated. Cell sites are coded with different colors in the map depending on the tear down activity. For example, dark red represents cells with a high number of tear downs, dark green is next worst, dark blue next worst, and so on. It can be appreciated that choice of a particular color scheme is not critical to display and interpretation of this graphical representation. In addition, shading and other patterns can be suitably employed in place of or in connection with the use of color in these graphical representations. An example of a Tear Down Report graphical representation is provided in FIG. 3.

By reviewing the Tear Down Report, management can discover what cells (dark red, green, blue, etc) exhibit an inordinate amount of tear down activity and undertake remedial measures in response to the report. The report can be run every week, biweekly, monthly, or with whatever frequency is desired.

Figure 5:
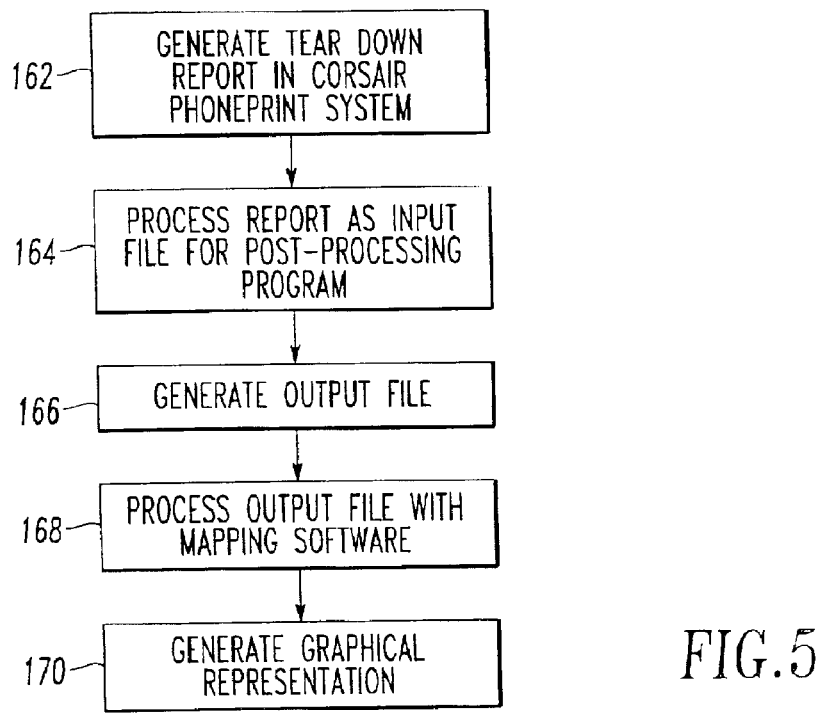
FIG. 5 is a flowchart of process steps used by a tear down report method and system.
Figure 8:
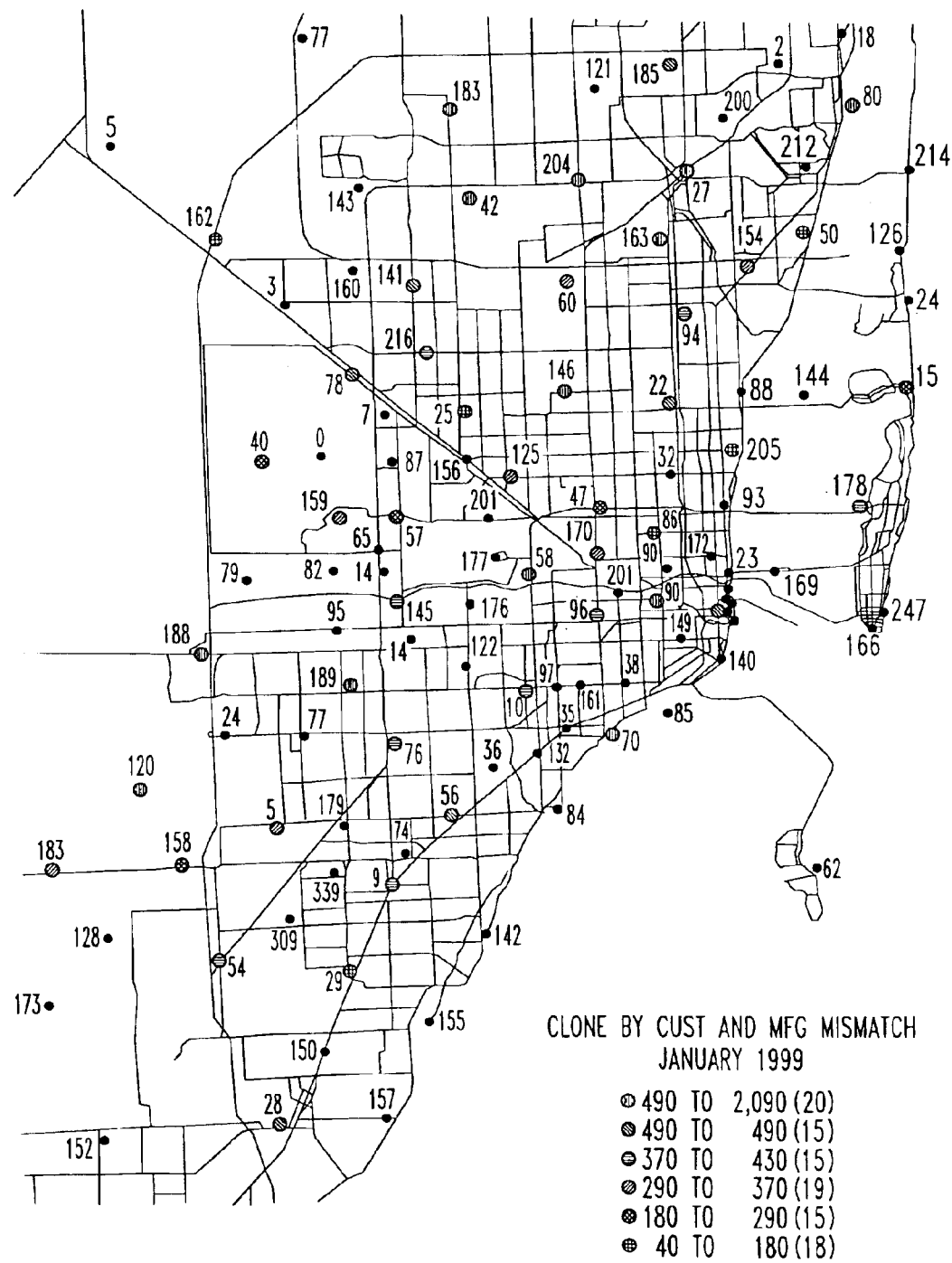
FIG. 8 shows a graphical representation of a tear down report.

Referring now to FIG. 5, the method and system are performed by a user logging into the Phoneprint system in step 162 and generating the Tear Down Report for the time period desired. For purposes of further data manipulation, the Tear Down Report can be stored as a text file, for example. The Tear Down Report is then transferred to a Unix-based machine or a suitable functionally equivalent machine where a post-processing program resides. This post-processing program can be executed in step 164 by a user typing, for example, a "idscl pp400" command, wherein the "pp400" portion represents the Phoneprint output for April of 2000. An illustration of this file prepared for December of 1999 can be seen in FIG. 6. In step 166, the program next generates an output file (e.g., map400) that can be input to the Mapinfo program in step 168 to generate a graphical representation in step 170 of the Tear Down Report. A sample of this output file can be seen in FIG. 7. A sample graphical representation of the tear down report is shown in FIG. 8.

Figures 9, 11B:
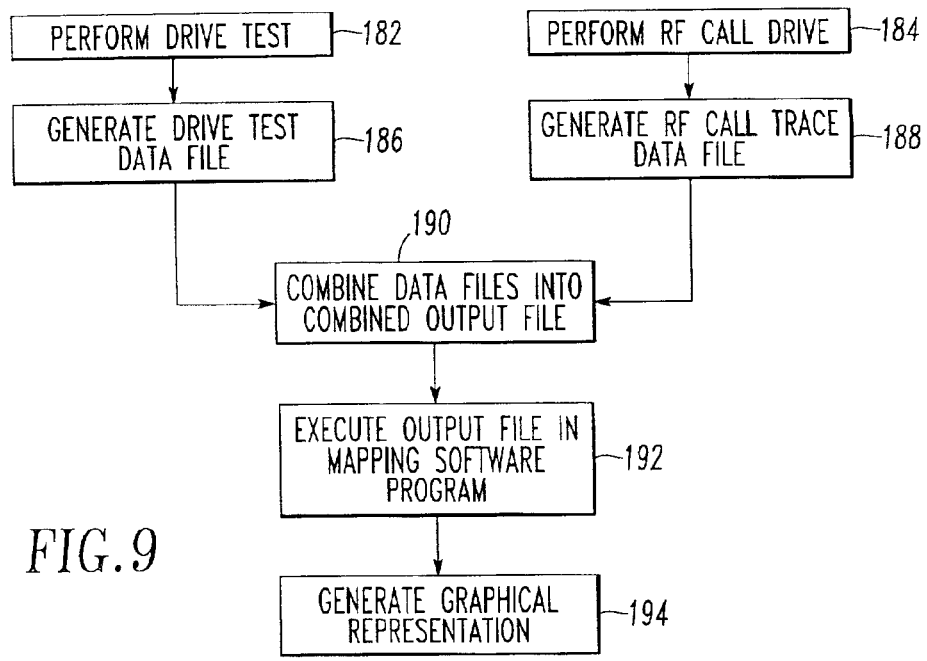

Referring now to FIG. 9, in another aspect, a method and system are provided that permit reverse mapping of telecommunications data in conjunction with Xtel and Lucent equipment. When there is a problem in a geographical area with making phone calls, RF engineers use Xtel equipment to physically move around the area (e.g., such as by driving in a car or van in a "drive test") to reproduce the problem as shown in step 182. This Xtel equipment is also used to collect data such as signal strength, BER, and other significant data which can be used to diagnose and resolve the problem. In operation, the Xtel equipment automatically makes phone calls to the system and, as the engineer drives around the area, the Xtel equipment captures information regarding the call. At the same time, at the switch location, an RF call trace is started as shown in step 184 on the above calls conducted by the Xtel equipment. This RF call trace is performed in conjunction with the drive test to gather data from both uplink and downlink paths and thereby provide a complete set of data to resolve the problem.

The data captured from use of the Xtel equipment and the RF call trace reside in two separate data files 186, 188. Each file contains information related to the time of the calls made during the drive test and RF trace procedures. A program is provided that takes these two output files generated from Xtel and RF call trace and combines them in step 190 based on the time information. The combined output file can contain, for example, the following fields: Time, Latitude, Longitude, Forward and Reverse Signal Strength, Forward and Reverse BER, and any other desired, collected information. The combined output file can then be opened in the Mapinfo program in step 192 and a graphical representation of the drive test can be generated in step 194 based on Signal Strength, BER, and other collected data. Different colors can be used to depict different levels of magnitude of signal strength, BER, and other collected data so that an Engineer looking at the graph can readily visually determine weak signal strength areas, areas with BER problem, and other measurements based on the collected data.

Figure 12:
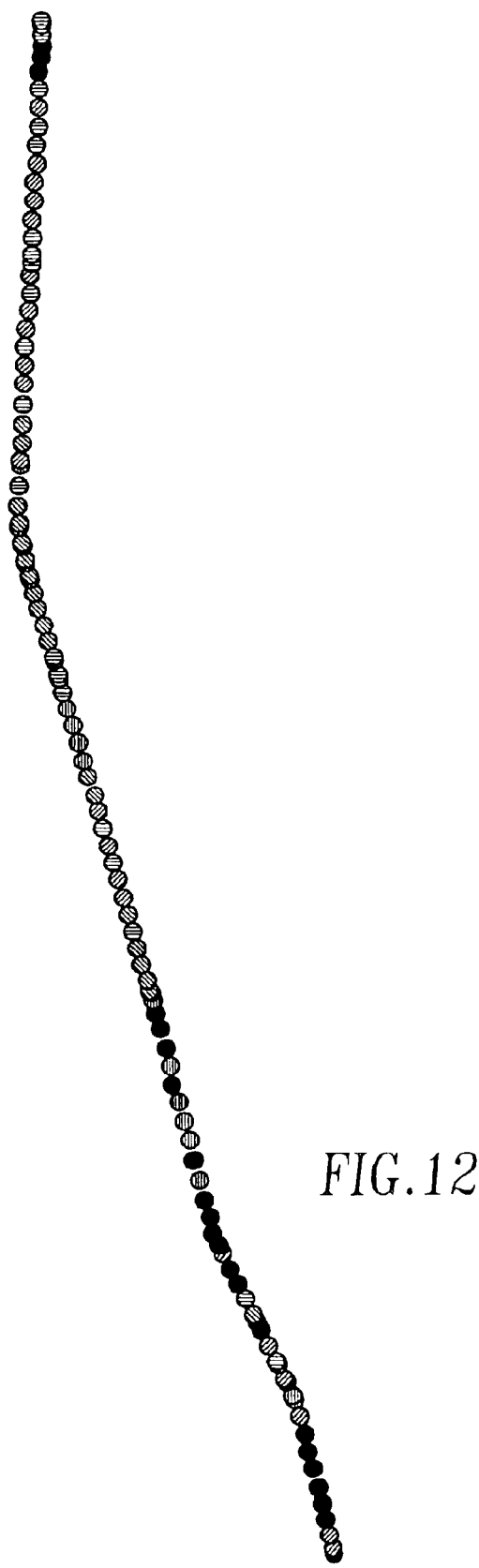
FIG. 12 illustrates a sample graphical representation plotted by signal strength for a given coverage area within a wireless network.

In another embodiment, the RF call trace is performed using Ericsson equipment. The program then uses the Xtel call tracking drive test data and combines it with Ericsson RF call trace data based on a common time between data files. A sample Ericsson log file can be seen in FIG. 10. Attributes such as Latitude, Longitude and Signal Strength can then be combined from an Xtel log file (a sample of which is shown in FIGS. 11A and 11B into an output file. This output file can be opened in Mapinfo and a graphical representation of the data over time can be presented to a user analyzing a problem with the wireless network. A sample of this graphical representation is shown in FIG. 12.

In general, Xtel data include longitude, latitude, and similar information derived from the area in which the drive test is conducted. The RF call trace data have signal strength and other relevant information. Both sets of data can be advantageously combined by this method and system based on time so that a graphical representation of the drive area can be generated. This graphical representation therefore borrows data from both Xtel and Lucent or Ericsson equipment to provide a combined output file that can be converted into a useful graphical representation of a given area.

The method and system can operate on a Unix-based system, for example, or on a suitably equivalent system such as a Windows NT system. Use of a Windows NT system enables the user to execute the program outside of the OMP of Lucent-based equipment.

The following is an example that demonstrates a possible implementation of this reverse mapping method and system. A user logs into a PC-based machine and enters an ericxtel.bat command from the directory from which the script is to be executed. The script expects the Xtel log file to be named "xtelfil" and the Ericsson log file to be named "ericfil" and these files must be present in this format in the directory from which the ericxtel.bat command is executed. The program then combines the two files namely, ericfil and xtelfil, based on common time data between the two files and outputs data from both files to a file named xtel.out. The user then inputs the xtel.out file to the Mapinfo program and can create a thematic map based on signal strength, BER, or other available attributes related to the gathered data.

Figure 15:
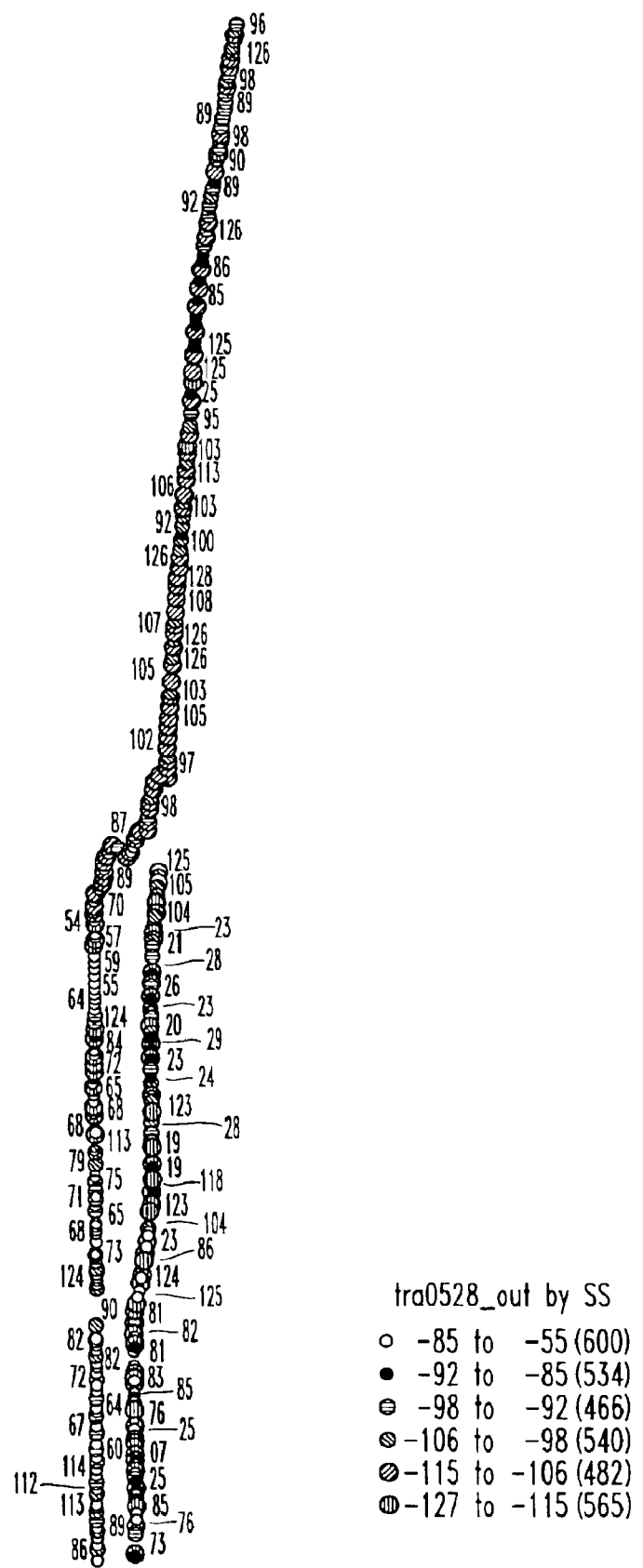

In still another embodiment, and incorporating by reference the above discussion related to Lucent and Ericsson RF call trace equipment, a method and system for Comarco and Hughes equipment can be provided. In this embodiment, graphical representations can be produced based on a combination of data files gathered from employment of Comarco call tracking drive test equipment Hughes RF call trace data. A sample Comarco data file is shown in FIGS. 13A and 13B. A sample Hughes data file is shown in FIG. 14. As discussed above, an output file having a common time element from each of these files can be input to the Mapinfo program to provide a graphical representation of call data based on signal strength, BER, or any other desired attributed collected in either of these files. A sample graphical representation of the Comarco and Hughes arrangement is provided in FIG. 15.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method for updating call-specific data in a database associated with operation of a wireless network, said method comprising:
    identifying as user input a Lucent Executive Cellular Processor (ECP) form and one or more fields associated with said form for which changes are desired;
    generating a script to update said form, said generating step including identifying one or more values associated with said call-specific data of said wireless network;
    creating an Autoplex 1000 database management (apxrcv) script based on said user input and said one or more values associated with said call-specific data; and
    executing said apxrcv script to update said form.

2. The method of claim 1, further comprising logging any errors while running said script in an error file.

3. The method of claim 1, further comprising obtaining one or more key fields corresponding to said one or more fields in said form.

4. The method of claim 1, wherein said identifying step further comprises entering multiple fields for update in said form.

5. The method of claim 1, further comprising executing said script in check mode to identify errors in said form without updating any of said fields in said form.

6. A computer-readable medium containing instructions for updating call-specific data in a database associated with operation of a wireless network, said medium comprising:
    instructions for retrieving as user input a Lucent Executive Cellular Processor (ECP) form and one or more fields associated with said form for which changes are desired;
    instructions for generating a script to update said form, said generating instructions including instructions for identifying one or more values associated with said call-specific data of said wireless network;
    instructions for creating an Autoplex 1000 database management (apxrcv) script based on said user input and said one or more values associated with said call-specific data; and
    instructions for executing said apxrcv script to update said form.

7. The medium of claim 6, further comprising instructions for logging any errors while executing said script in an error file.

8. The medium of claim 6, further comprising instructions for obtaining one or more key fields corresponding to said one or more fields in said form.

9. The medium of claim 6, wherein said instructions for identifying further comprise instructions for receiving multiple fields for update in said form.

10. The medium of claim 6, further comprising instructions for executing said script in check mode to identify errors in said form without updating any of said fields in said form.

11. A system for updating call-specific data in a database associated with operation of a wireless network, said system comprising:
    a user input device for identifying a Lucent Executive Cellular Processor (ECP) form and one or more fields associated with said form for which changes are desired;
    a processor for generating a script to update said form, said processor being programmed for identifying one or more values associated with said call-specific data of said wireless network;
    a memory containing an Autoplex 1000 database management (apxrcv) script generated from said user input and said one or more values associated with said call-specific data; and
    a processor for executing said apxrcv script to update said form.

12. The system of claim 11, further comprising an error log.

13. A method for updating call-specific data in a database associated with operation of a wireless network, said method comprising:
    identifying as user input a Lucent Executive Cellular Processor (ECP) form and one or more fields associated with said form for which changes are desired, wherein said form is selected from the group consisting of cell2, ceqcom2, ceqface, ceqsu2, ctm, dcch, ecp, fci, resel and tpptm;
    generating a script to update said form, said generating step including identifying one or more values associated with said call-specific data of said wireless network;

creating an Autoplex 1000 database management (apxrcv) script based on said user input and said one or more values associated with said call-specific data; and executing said apxrcv script to update said form.

14. A method for updating call-specific data in a database associated with operation of a wireless network, said method comprising:

identifying as user input a Lucent Executive Cellular Processor (ECP) form and one or more fields associated with said form for which changes are desired;

generating a script to update said form, said generating step including identifying one or more values associated with said call-specific data of said wireless network;

creating an Autoplex 1000 database management (apxrcv) script based on said user input and said one or more values associated with said call-specific data;

executing said apxrcv script to update said form; and entering one or more form names into an Operations and Management Platform/Executive Cellular Processor (OMP/ECP) configuration to obtain any field names associated with said form names.

15. The method of claim 14, further comprising displaying said field names.

16. A computer-readable medium containing instructions for updating call-specific data in a database associated with operation of a wireless network, said medium comprising:

instructions for retrieving as user input a Lucent Executive Cellular Processor (ECP) form and one or more fields associated with said form for which changes are desired, wherein said form is selected from the group consisting of cell2, ceqcom2, ceqface, ceqsu2, ctm, dcch, ecp, fci, resel and tpptm;

instructions for generating a script to update said form, said generating instructions including instructions for identifying one or more values associated with said call-specific data of said wireless network;

instructions for creating an Autoplex 1000 database management (apxrcv) script based on said user input and said one or more values associated with said call-specific data; and instructions for executing said apxrcv script to update said form.

17. A computer-readable medium containing instructions for updating call-specific data in a database associated with operation of a wireless network, said medium comprising:

instructions for retrieving as user input a Lucent Executive Cellular Processor (ECP) form and one or more fields associated with said form for which changes are desired;

instructions for generating a script to update said form, said generating instructions including instructions for identifying one or more values associated with said call-specific data of said wireless network;

instructions for creating an Autoplex 1000 database management (apxrcv) script based on said user input and said one or more values associated with said call-specific data;

instructions for executing said apxrcv script to update said form; and instructions for entering one or more form names into an Operations and Management Platform/Executive Cellular Processor (OMP/ECP) configuration to obtain any field names associated with said form names.

18. The medium of claim 17, further comprising instructions for displaying said field names.

19. A system for updating call-specific data in a database associated with operation of a wireless network, said system comprising:

a user input device for identifying a Lucent Executive Cellular Processor (ECP) form and one or more fields associated with said form for which changes are desired;

a processor for generating a script to update said form, said processor being programmed for identifying one or more values associated with said call-specific data of said wireless network;

a memory containing an Autoplex 1000 database management (apxrcv) script generated from said user input and said one or more values associated with said call-specific data; and a processor for executing said apxrcv script to update said form; and an Operations and Management Platform/Executive Cellular Processor (OMP/ECP) configuration.

* * * * *